(12) United States Patent
Harrison et al.

(10) Patent No.: US 10,694,014 B2
(45) Date of Patent: Jun. 23, 2020

(54) HAPTIC LOCOMOTION USING WIDE-BAND ACTUATOR

(71) Applicant: Apple Inc., Cupertino, CA (US)

(72) Inventors: Jere C. Harrison, Mountain View, CA (US); Alex J. Speltz, San Francisco, CA (US); Sheng Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 15/713,555

(22) Filed: Sep. 22, 2017

(65) Prior Publication Data

US 2019/0098122 A1 Mar. 28, 2019

(51) Int. Cl.
| | |
|---|---|
| *H04M 1/18* | (2006.01) |
| *G05B 9/02* | (2006.01) |
| *H04M 1/725* | (2006.01) |
| *H02J 50/90* | (2016.01) |
| *H02J 50/10* | (2016.01) |
| *H04M 1/02* | (2006.01) |

(52) U.S. Cl.
CPC ............ *H04M 1/185* (2013.01); *G05B 9/02* (2013.01); *H02J 50/90* (2016.02); *H04M 1/72569* (2013.01); *H02J 50/10* (2016.02); *H04M 1/026* (2013.01)

(58) Field of Classification Search
CPC .. H04M 1/185; H04M 1/72569; H04M 1/026; G06F 3/016; G06F 1/72569; H02J 50/10; G05B 9/02
See application file for complete search history.

(56) References Cited

U.S. PATENT DOCUMENTS

| | | | |
|---|---|---|---|
| 7,623,301 B2 | 11/2009 | Westerweek et al. | |
| 8,099,126 B2 | 1/2012 | Griffin | |
| 8,872,448 B2 | 10/2014 | Boldyrev et al. | |
| 9,283,966 B2 * | 3/2016 | Choi | B60T 8/172 |
| 9,342,108 B2 | 5/2016 | Rothkopf et al. | |
| 9,448,713 B2 | 9/2016 | Cruz-Hernandez et al. | |
| 2006/0273749 A1 * | 12/2006 | Im | G05D 1/0225 |
| | | | 318/587 |

(Continued)

OTHER PUBLICATIONS

A. G. S. Conceicao, M. D. Correia and L. Martinez, "Modeling and friction estimation for wheeled omnidirectional mobile robots," Robotica, vol. 34, (9), pp. 2140-2150, 2016. Available: https://search.proquest.com/docview/1807268761?accountid=14753. DOI: http://dx.doi.org/10.1017/S0263574715000065.*

*Primary Examiner* — Christopher E. Everett
(74) *Attorney, Agent, or Firm* — Fish & Richardson P.C.

(57) ABSTRACT

The disclosed embodiments of haptic locomotion use one or more actuators to: 1) determine the properties of contact surfaces to improve various applications that use haptic locomotion; 2) automatically improve power transfer efficiency during wireless charging or cellular or wireless signal reception; 3) increase device accessibility for visually or hearing impaired users; 4) improve speaker and microphone performance; 5) protect a free falling mobile device from impact damage by orienting the mobile device to a low-risk orientation during free fall, or by driving the mobile device away from a high-risk orientation during free fall; and 6) control asymmetric surface friction using a directional magnetic field provided by an actuator to improve haptic locomotion in a desired direction of travel.

21 Claims, 16 Drawing Sheets

(56) References Cited

U.S. PATENT DOCUMENTS

| | | | | |
|---|---|---|---|---|
| 2008/0039974 | A1* | 2/2008 | Sandin | G05D 1/0225 700/258 |
| 2012/0200254 | A1* | 8/2012 | Yoon | H02J 7/025 320/108 |
| 2013/0218395 | A1* | 8/2013 | Kim | G05D 1/0246 701/23 |
| 2013/0261811 | A1* | 10/2013 | Yagi | G06F 3/016 700/280 |
| 2013/0300356 | A1* | 11/2013 | Yang | H02J 7/0047 320/108 |
| 2014/0071545 | A1* | 3/2014 | Sumioka | G02B 27/646 359/813 |
| 2014/0100693 | A1* | 4/2014 | Fong | G05D 1/0274 700/253 |
| 2014/0222271 | A1* | 8/2014 | Merten | H02J 7/025 701/22 |
| 2015/0096276 | A1* | 4/2015 | Park | A01D 34/008 56/10.2 A |
| 2015/0301602 | A1* | 10/2015 | Dow | G06F 3/016 345/156 |
| 2015/0375395 | A1* | 12/2015 | Kwon | A47L 9/2857 700/245 |

* cited by examiner

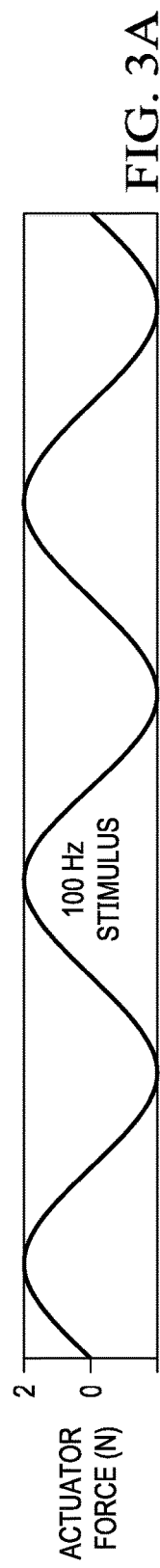
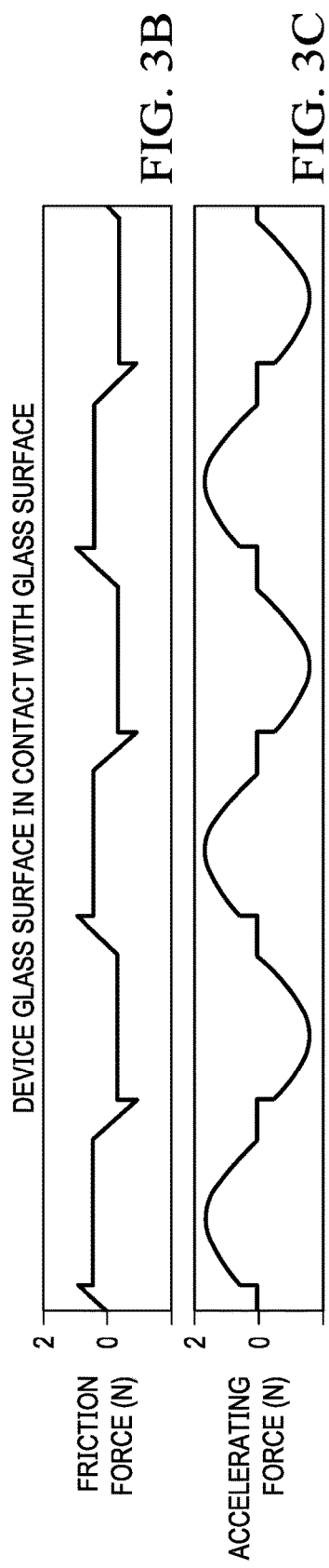
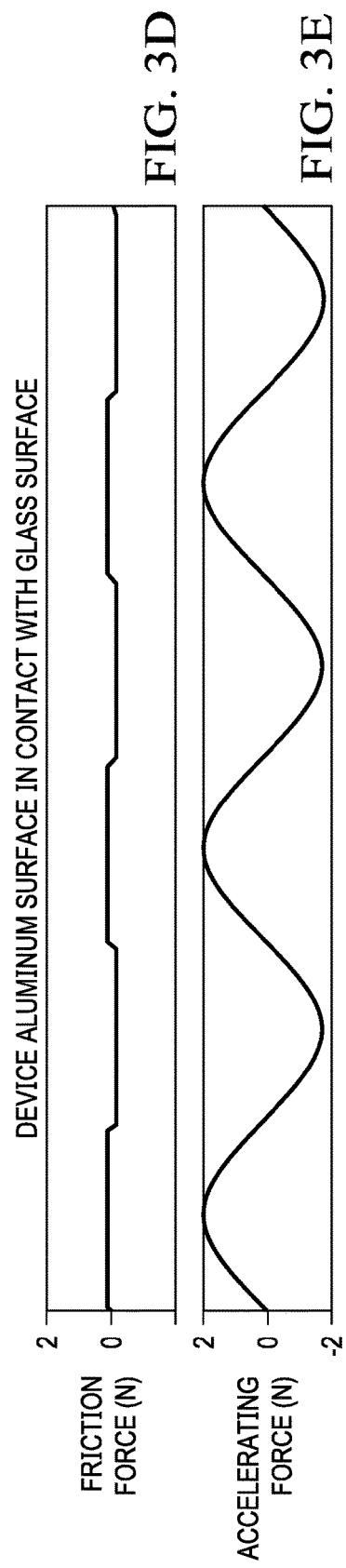
FIG. 3A
FIG. 3B
FIG. 3C
FIG. 3D
FIG. 3E
FIG. 3F

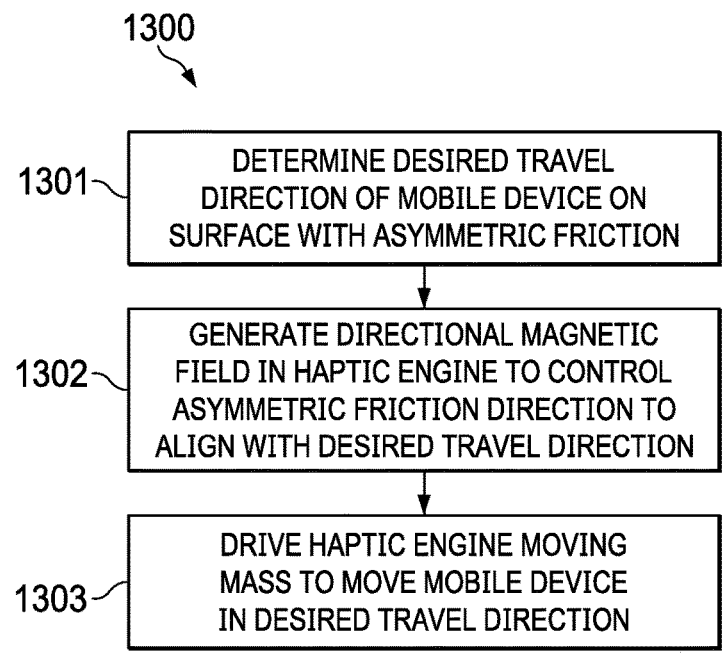
FIG. 13
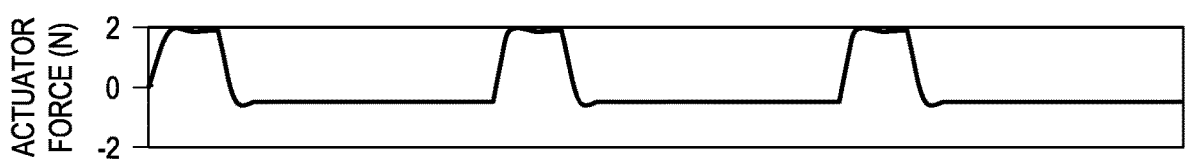
FIG. 15A
FIG. 15B
FIG. 15C

HAPTIC LOCOMOTION USING WIDE-BAND ACTUATOR

TECHNICAL FIELD

This disclosure relates generally to haptic engines integrated in mobile devices.

BACKGROUND

The performance of many applications performed by a mobile device (e.g., a smartphone, tablet device, wearable device) are dependent on the position and orientation of the mobile device relative to a user, a surface or a station delivering a signal or data to the mobile device. Some examples of applications where the spatial orientation of a mobile device can improve performance, include but are not limited to: improved power transfer efficiency during wireless charging of the mobile device, improved loudspeaker and microphone performance in noisy environments and improved cellular or wireless network connectivity. For example, when a mobile device is lying on a surface (e.g., lying on a table) or mounted in a docking station, the user may have to manually position or rotate the device to improve reception of wireless signals from a cellular transmitter or network access point (e.g., a wireless router). To do this, they can look at the wireless signal strength indicator on their device (e.g., signal bars) while they manipulate their mobile device. In some situations, however, the user may not be aware that their device can be physically manipulated to improve performance of a particular application. For example, in a wireless charging application, the user may not realize that the spatial orientation of the device on a charging mat can increase the power transfer efficiency.

Even if the user is aware of a particular performance improvement, the device itself may be incapable of providing visual or audio feedback to guide the user to manually adjust the position and orientation of the device to improve performance. In cases where the mobile device is lying on a surface or otherwise off the body of the user, it is desirable for the mobile device to automatically adjust its position and/or orientation on the surface to improve performance of a particular application without assistance by the user.

SUMMARY

The disclosed embodiments of haptic locomotion use one or more actuators to: 1) determine the properties of contact surfaces to improve various applications that use haptic locomotion; 2) automatically improve power transfer efficiency during wireless charging or cellular or wireless signal reception; 3) increase device accessibility for visually or hearing impaired users; 4) improve speaker and microphone performance; 5) protect a free falling mobile device from impact damage by orienting the mobile device to a low-risk orientation during free fall, or by driving the mobile device away from a high-risk orientation during free fall; and 6) control asymmetric surface friction using a directional magnetic field provided by an actuator to improve haptic locomotion in a desired direction of travel.

In an embodiment, a method comprises: driving one or more actuators of a mobile device lying on a surface; receiving, by a processor of the mobile device, motion data from one or more motion sensors of the mobile device, the motion data describing the mobile device motion on the surface resulting from driving the one or more actuators; determining, by the processor, a friction coefficient based on the motion data; determining, by the processor, one or more surface types based on the determined friction coefficient; and initiating, by the processor, one or more actions on the mobile based on the one or more determined surface types.

In an embodiment, a method comprises: determining a target location and orientation of a mobile device on a surface; determining a current location and orientation of the mobile device on the surface; generating one or more waveforms based on the current and target mobile device locations and orientations; responsive to the one or more waveforms, driving one or more actuators of the mobile device to move the mobile device on the surface; measuring the motion of the mobile device on the surface resulting from driving the one or more actuators with the one or more waveforms; based at least in part on the measuring, determining that the mobile device has reached the target location and orientation; and initiating one or more actions on the mobile at the target location and orientation.

In an embodiment, a method comprises: determining, by a processor of a mobile device, that the mobile device is in freefall, the determining based on motion data from one or more motion sensors of the mobile device; determining, by the processor of the mobile device, a low-risk orientation based on the motion data; and commanding, by the processor of the mobile device, a movable mass of a haptic engine embedded in the mobile device into vibratory state based on the low-risk orientation and the motion data, the vibratory state resulting in a mechanical force that slows or stops rotation of the mobile device at or near the low-risk orientation.

In an embodiment, a method comprises: determining, by a processor of a mobile device, a desired direction of travel of the mobile device on a surface with asymmetric friction; generating a directional magnetic field that aligns the direction of the asymmetric friction with the direction of travel; and driving one or more movable masses of the haptic engine to move the mobile device in the direction of travel.

Other embodiments are directed to system, device and non-transitory computer-readable storage mediums.

Particular embodiments disclosed herein provide one or more of the following advantages. In an embodiment, haptic locomotion is used to determine the properties of contact surfaces to improve various applications that use haptic locomotion. For example, knowledge of contact surface materials can be used to generate waveforms for haptic locomotion to move a mobile device along the surface from a current location and orientation to a target location and orientation. The target location and orientation can be user programmed or determined automatically to improve power transfer efficiency during wireless charging, improve cellular or wireless signal reception, increase device accessibility for visually or hearing impaired users and improve speaker and microphone performance.

In an embodiment, haptic locomotion is used to protect a free falling mobile device from impact damage by orienting the mobile device to a low-risk orientation during free fall, or by driving the mobile device away from a high-risk orientation during free fall.

In another embodiment, a surface with asymmetric friction can be controlled by a directional magnetic field provided by an actuator to improve haptic locomotion in a desired direction of travel.

The details of the disclosed embodiments are set forth in the accompanying drawings and the description below.

Other features, objects and advantages are apparent from the description, drawings and claims.

DESCRIPTION OF DRAWINGS

FIGS. 3A-3E are plots illustrating haptic locomotion forces associated with surface tribology measurements, according to an embodiment.

FIG. 3F is an example look-up table for surface materials based on static and kinetic friction coefficients, according to an embodiment.

FIG. 13 is a flow diagram of an example process of controlling asymmetric surface friction using a haptic locomotion system, according to an embodiment.

FIGS. 15A-15C are plots of an example actuation force, friction force and accelerating force associated with haptic locomotion using a wide-band actuator, according to an embodiment.

The same reference symbol used in various drawings indicates like elements.

DETAILED DESCRIPTION

A haptic engine includes a mass positioned in a housing that is driven to move or oscillate to induce a vibratory response. One or more magnetic field sensors (e.g., Hall sensors) can be included in the housing that vary their output voltages in response to changes in a magnetic field as the mass moves along a movement axis within the housing. The output voltages are used by a controller to estimate position and velocity of the mass on the movement axis.

The motion of a mobile device with an integrated wide-band actuator can be controlled by modulating the actuator force in one or more directions using a haptic locomotion system. The relative position and angle change of a mobile device due to the actuator force can be determined using inertial measurement sensors of the mobile device (e.g., accelerometer, gyroscope) and absolute position and orientation sensors, including but not limited to: a magnetometer, barometer/altimeter, Global Navigation Satellite System (GNSS) receiver, wireless network location technology (e.g., Wi-Fi, cellular), etc.

Using inertial sensor measurements, the mobile device can determine the properties of surfaces in contact with the mobile device (also referred to here as "surface tribology"). Using knowledge of the surface properties (e.g., glass, metal, wood), the mobile device can generator a waveform driving the actuator, which imparts motion to the mobile device, such that the mobile device moves towards a target location and/or orientation. In an embodiment, the haptic locomotion system can orient the mobile device into a low-risk orientation, or avoid a high-risk orientation, during free fall. In an embodiment, a surface with asymmetric friction can be controlled by a magnetic field generated by the actuator to improve haptic locomotion.

Example Application of Haptic Locomotion

Figure 1:
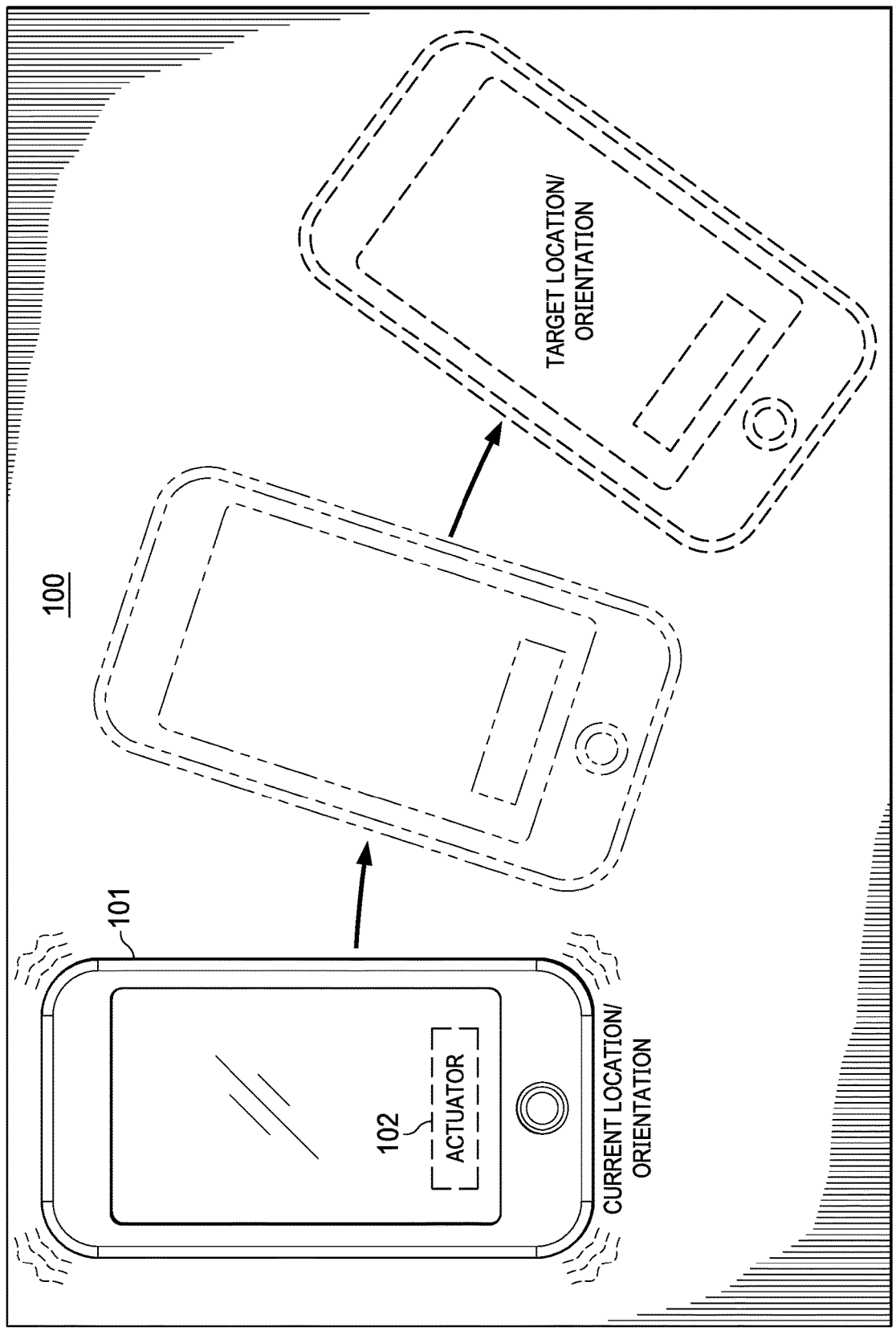
FIG. 1 illustrates using a haptic locomotion system to change a location and/or orientation of a mobile device, according to an embodiment.

FIG. 1 illustrates an example haptic locomotion system 100 for controlling motion of mobile device 101, according to an embodiment. Mobile device 101 includes a wide-band actuator 102, which provides an actuator force that can be modulated by a control application running on a processor of mobile device 101. Actuator 102 can provide an actuator force along one or more axes of a reference coordinate system (e.g., a body coordinate system). Mobile device 101 can include one or more actuators 102. For example, mobile device 101 can include two one-dimensional (1D) linear actuators or one two-dimensional (2D) linear actuator.

In the example shown, actuator 102 is commanded to "tap" mobile device towards a target location and orientation. By selectively applying the direction and duration of actuator force, the haptic locomotion can be controlled to tap mobile device 101 along a trajectory to the target location and orientation. For example, a pulse or tap can be affected by the actuator in response to an actuator command which causes the actuator to move. An inertial sensor reading determines the current location and orientation of mobile device 101 after the tap is applied and generates another actuator command based on the inertial sensor readings. This haptic locomotion process continues until the inertial sensor readings indicate that the target location and orientation have been reached to within a threshold tolerance (e.g., range and angle thresholds)

A haptic engine can be implemented by an actuator. An actuator can be a linear resonant actuator (LRA) or an eccentric rotating mass actuator (ERA). An LRA is a precision vibration motor that produces an oscillating force across a single axis. The LRA actuator uses alternating current (AC) voltage to drive a coil proximate to a moving mass that is connected to a resistance force (e.g., a spring). When the coil is driven at the resonant frequency of the spring, the entire LRA vibrates. The frequency and amplitude of a LRA may be adjusted by changing the AC input. An ERM actuator motor converts direct current (DC) into a mechanical force that rotates an off-center mass. Rotation of the off-center mass produces an asymmetric centripetal force, which produces a non-zero centrifugal force. When the ERM actuator motor is driven at a high number of rotations per minute (RPM), a consistent displacement of actuator force produces lateral vibration.

Example Haptic Locomotion System

Figure 2:
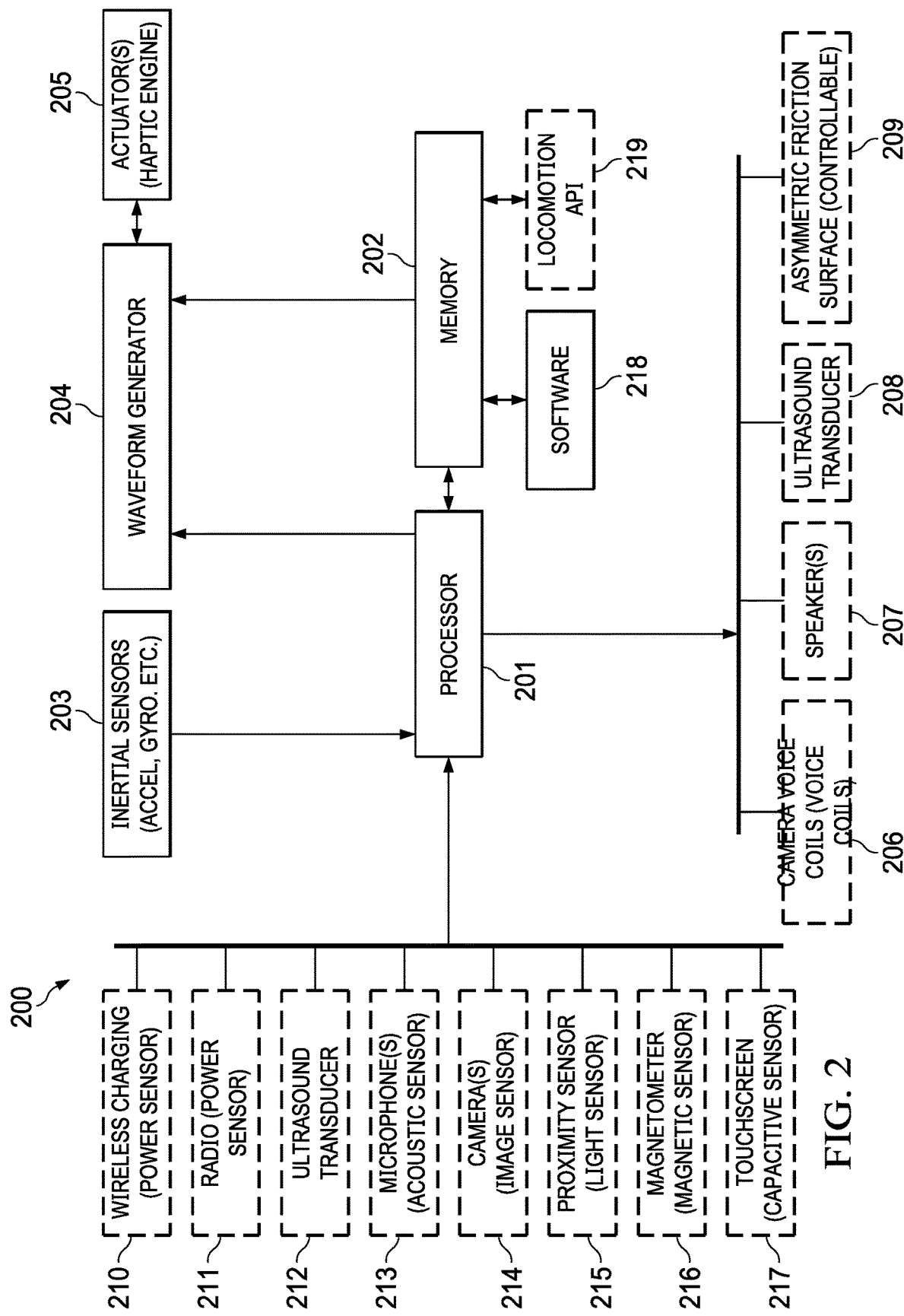
FIG. 2 is a block diagram of an example haptic locomotion system, according to an embodiment.

FIG. 2 is a block diagram of an example haptic locomotion system 200, according to an embodiment. System 200 includes one or more processors 201, memory 202, one or more inertial sensors 203 (e.g., accelerometer, gyro, digital compass), waveform generator 204 and one or more actuators 205. Memory 202 includes instructions for software 218 and locomotion application programming interface (API) 219. Software can include operating system instructions, application instructions and instructions to perform haptic locomotion, as described herein. Locomotion API 219 can be called by an application running on the mobile device to communicate with haptic locomotion system 200.

Depending on the application and/or the capabilities of the mobile device, system 200 can further include one or more of the following optional items: camera voice coil(s) 206, speaker(s) 207, ultrasound transducer 208, asymmetric friction surface controller 209, wireless charging power sensor 210, radio power sensor 211, ultrasound transducer 212, one or more microphones or other acoustic sensors 213, one or more camera image sensors 214, one or more proximity sensors 215 (e.g., a light sensor), magnetometer 216 and touch screen 217 (e.g., a capacitive sensor). System 200 can be implemented in any type of mobile device, including but not limited to: smartphones, tablet devices and wearable computers (e.g., smart watch, fitness band).

FIGS. 3A-3C are plots illustrating forces associated with surface tribology measurements using haptic locomotion system 200, according to an embodiment. FIGS. 3A, 3B, 3C illustrate an example actuator force, friction force and accelerating force, respectively for a glass surface of a mobile device in contact with a glass surface. FIGS. 3D and 3E illustrate an example friction force and accelerating force for an aluminum surface of the mobile device in contact with a glass surface. FIG. 3F is an example look-up table of surface materials.

Haptic locomotion system 200 can determine the type of surface in contact with the mobile device by driving mobile device into motion using actuator force and then sensing the resulting motion. The level of the actuator force, the amplitude and orientation of the motion in the presence of kinetic friction, the smoothness of motion in the presence of kinetic friction and the level of force that returns the mobile device to static friction can be used alone or in combination to determine the surface type.

Equations [1] and [2] can be used to determine static and kinetic coefficients of friction, respectively:

$$F_s = \mu_s N, \quad [1]$$

$$F_k = \mu_k N, \quad [2]$$

where $F_s$ is the force of static friction, $\mu_s$ is the coefficient of static friction, $F_k$ is the force of kinetic friction, $\mu_k$ is the coefficient of kinetic friction and N is the normal force.

The static and kinetic friction coefficients represent, respectively, how much two touching surfaces grip each other when stationary and when moving relative to each other. The normal force is the force a surface applies to the mobile device to keep it sitting on a surface. On a flat surface, the normal force is equal to the force of gravity acting down on the mobile device, and can be calculated by taking the mass of the mobile device and multiplying it by the acceleration due to gravity.

Once the static and/or kinetic frictions coefficients are determined, the friction coefficients are used to determine the material of the contact surface. For example, referring to the second row of the look-up table in FIG. 3F, if the static friction coefficient is 0.17 and the kinetic friction coefficient is 0.14, then the contact surface materials are aluminum and glass.

Referring again to FIG. 2, when performing surface tribology, waveform generator 204 is instructed or commanded by processor 201 to generate one or more waveforms to drive one or more actuators 205. Inertial sensors 203 (e.g., an accelerometer) of the mobile device can measure the resulting motion, which can be multiplied by the mass of the mobile device to determine the friction force. Equations [1] or [2] are then solved for the static and kinetic friction coefficients, respectively, and used to look-up the surface materials. If the force needed to overcome friction is measured than equation [1] can be used. If the force is measured while the mobile device is in motion, then equation [2] can be used. In some embodiments, both static and kinetic coefficients of friction can be calculated and used to determine surface materials.

In an embodiment, system 200 can use inertial sensors 203 to determine the angle of the contact surface relative to gravity by measuring the asymmetry of the mobile device motion. If the mobile device is lying on a sloped surface, then gravity will cause the direction of travel to deviate from the direction of the actuator force. This asymmetry of motion can be measured during a transition between static and kinetic friction in opposite driving directions, or while in the kinetic friction state, by measuring the relative angle between the direction of drive motion and the direction of actual motion. If the angle of the contact surface exceeds a threshold value the mobile device is determined to be on a sloped surface, and processor 201 can terminate the surface tribology application or perform some other action.

Figure 4:
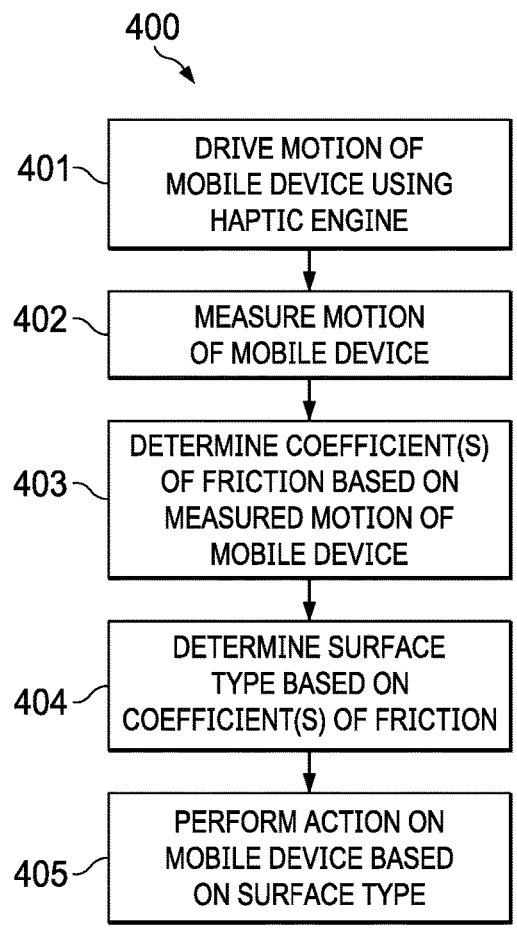
FIG. 4 is a flow diagram of an example surface tribology measurement process using a haptic locomotion system, according to an embodiment.

FIG. 4 is a flow diagram of an example surface tribology measurement process 400 using a haptic engine locomotion system, according to an embodiment. Process 400 can be implemented by device architecture 1700, as described in reference to FIG. 17.

Process 400 can begin by driving the motion of a mobile device using a haptic engine (401). For example, a waveform generator can generate a waveform to drive one or more actuators of the mobile device, where one or more actuator forces cause the mobile to move on the contact surface. For example, one 1D linear actuator or two 1D linear actuators can be driven to impart motion to the mobile device. In the case of two 1D linear actuators, the two 1D linear actuators can be arranged relative to each other such that their respective actuator forces can be combined or used independently to move the mobile device in any direction on the surface.

Process 400 can continue by measuring the motion of the mobile device (402). For example, one or more inertial sensors (e.g., an accelerometer, gyro, magnetometer) can be used to measure device motion.

Process 400 can continue by determining static and kinetic coefficients of friction based on the measured motion of the mobile device (403). For example, the static and kinetic coefficients of friction (equations [1] and [2]) can be used to determine the static and kinetic coefficients of friction.

Process 400 can continue by determining the surface type based on the coefficients of friction (404). For example, the coefficients of friction can be used to look-up surface materials in a look-up table.

Process 400 can continue by performing one or more actions on the mobile device based on the surface type (405). For example, a waveform used to drive the actuator can be adapted to correct for the surface type and mobile device orientation. In an embodiment, process 400 optionally terminates the surface tribology application if process 400 detects an asymmetry of motion of the driven mobile device indicating that the mobile device is lying on a sloped surface. If the mobile device is lying on a sloped surface, the actuator force could cause the mobile device to slide down the surface under the force of gravity resulting in in an inaccurate measurement, and possibly damaging the mobile device if the device motion cannot be stopped.

Figure 5A:
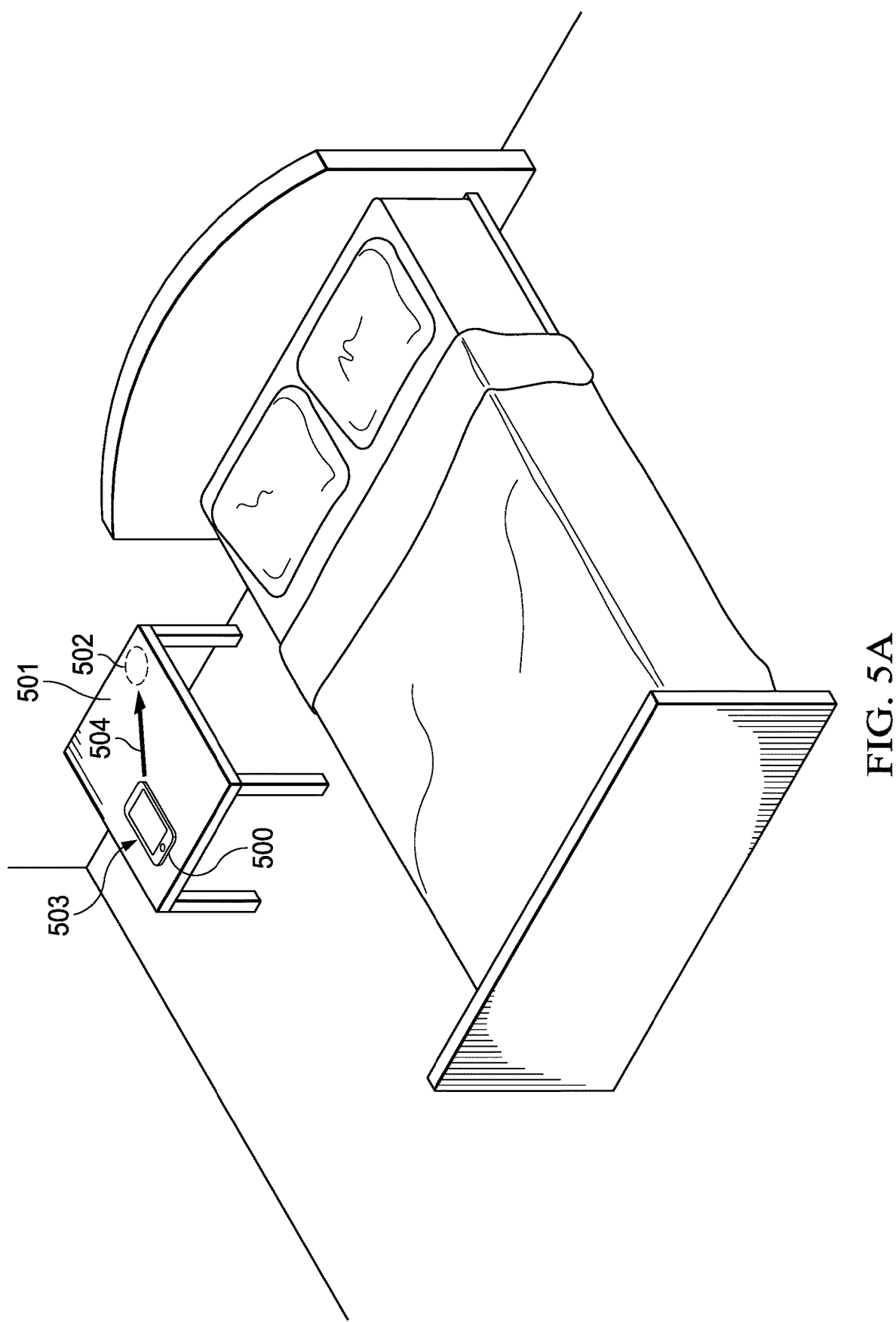
FIG. 5A illustrates the use of a haptic locomotion system to improve accessibility for vision or hearing impaired users, according an embodiment.

FIG. 5A illustrates the use of a haptic locomotion system to improve accessibility for vision or hearing impaired users, according an embodiment. In this application, mobile device 500 changes its position and orientation when mobile device 500 recognizes being set on a known surface location where the user has set a desired position and orientation. The application can provide improvements that include but are not limited to: improved accessibility to the mobile device for users with visual or hearing impairment, relocation of the mobile device to an ideal acoustic location for playing music or recording audio, relocating the mobile device to an ideal location for receiving and transmitting data and/or relocating the mobile device to an ideal location for receiving wirelessly transmitted power.

In an embodiment, mobile device 500 recognizes that it is on a nightstand and relocates itself to a programmed position and orientation on the nightstand 501. For example, the user can program target location 502 in mobile device 500, which can be compared to current location 503 to generate direction vector 504. Direction vector 504 is then used to generate one or more waveforms that will drive one or more actuators on mobile device 500, causing mobile device 500 to move along direction vector 504 towards target location 502. Each waveform can include one or more pulses that drive a specified level of actuator force for a specified period of time to "tap" mobile device 500 toward target location 502. One or more inertial sensors of mobile device 500 can be used to determine the current location 503 and orientation of mobile device 500 and to determine when target location 502 and orientation have been reached. In an embodiment, a command line-of-sight (LOS) algorithm or other algorithm can be used with direction vector 504 as the LOS to generate one or more waveforms for driving the one or more actuators. For example, if the direction of motion of the mobile device calculated from the sensor data deviates from direction vector 504 by a threshold angular distance, the actuator is driven by a waveform that will reduce or correct the deviation.

In an embodiment, mobile device 500 can automatically recognize when mobile device 500 is placed on the user's wooden nightstand 501 using inertial sensors 203 and previously stored information. For example, processor 201 can determine that mobile device 500 is lying on a surface (e.g., based on accelerometer and gyro sensor readings) that is located in the user's bedroom or house (e.g., based on Wi-Fi positioning data), and that the surface is made of a particular material (e.g., wood or glass). Processor 201 can also determine based on the current time (e.g., after 9:00 PM) or other user activity patterns that the user is likely in bed. Based on these determinations, processor 201 can determine that mobile device 500 is lying on nightstand 501 and should be moved to the user's desired location 502 and orientation on nightstand 501. In another embodiment, the user can speak a command that is recognized by a speech recognition engine implemented by mobile device 500 that commands mobile device 500 to move to its programmed location and orientation 502.

The application described above allows a visually or hearing impaired user to find or hear their mobile device more easily and or orientate the direction of a mobile device microphone in the direction of the user, as described with reference to FIG. 5B.

Figure 5B:
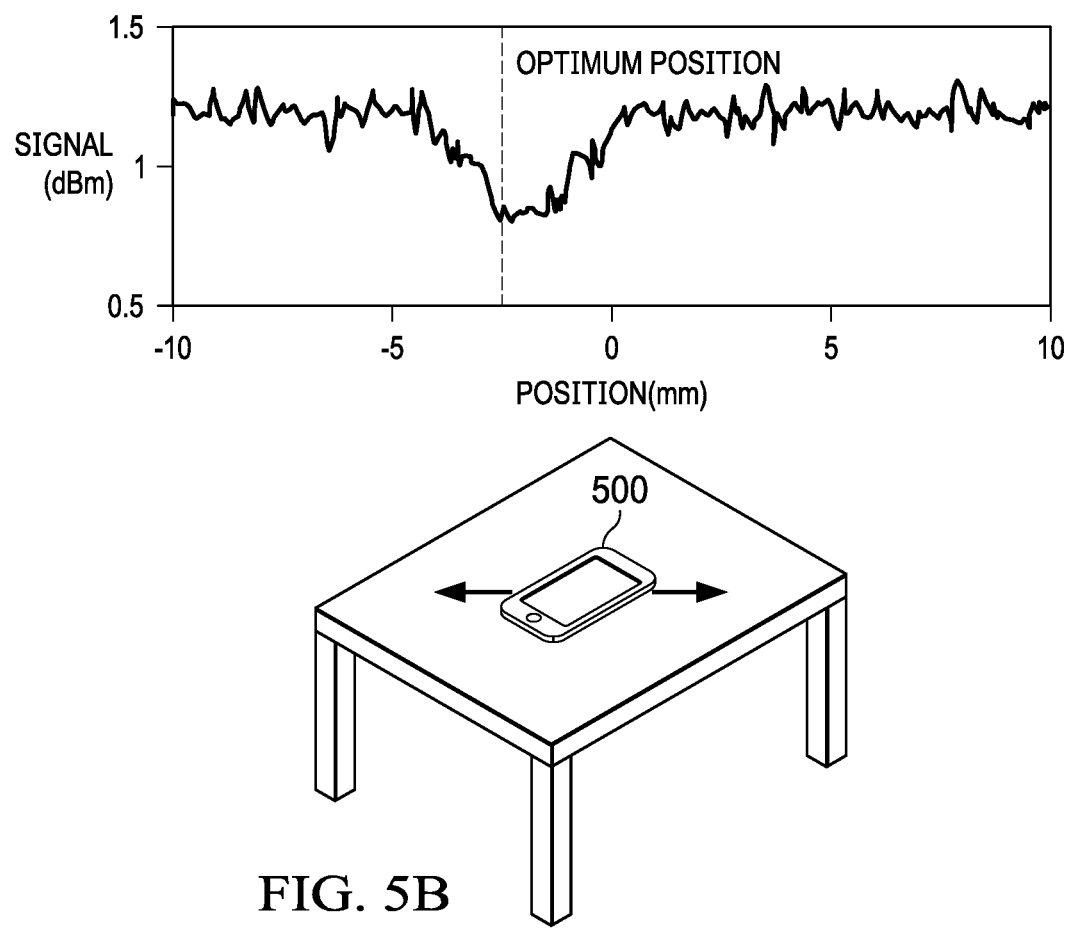
FIG. 5B illustrates the use of a haptic locomotion system to improve speaker or microphone performance, according an embodiment.

FIG. 5B illustrates the use of a haptic locomotion system to improve speaker or microphone performance, according to an embodiment. In the example plot shown, mobile device 500 searches for an optimum position and orientation for acoustic performance. For example, knowledge of the contact surface materials and current position and orientation of mobile device 500 in a local-level coordinate system, one or more waveforms can be generated that drive the actuator to the optimum position and orientation as illustrated in the example plot. In other embodiments, mobile device 500 can be configured to measure local gradients in wireless communication signals, measure local gradients in wireless power transfer intensity, measure local gradients in acoustic transfer function (e.g., obstructed speaker vent, obstructed microphone) or measure local gradients in light intensity.

Figure 6:
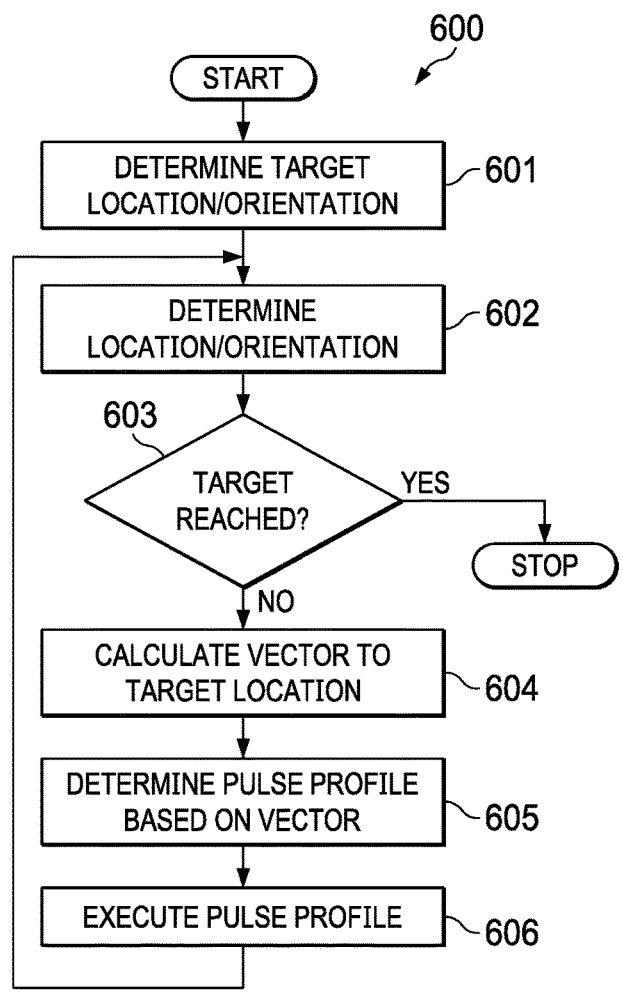
FIG. 6 is a flow diagram of an example process for moving a mobile device to a target location and orientation using a haptic locomotion system, according to an embodiment.

FIG. 6 is a flow diagram of an example process 600 for moving a mobile device to a target location and orientation using a haptic locomotion system, according to an embodiment. Process 600 can be implemented by device architecture 1700, as described in reference to FIG. 17.

Process 600 can begin by determining a target location and orientation for a mobile device (601). For example, a position and orientation can be programmed by a user or automatically determined by an application. Next process 600 determines a current position and orientation of the mobile device (602). For example, inertial sensors and location position technology can be used to determine the current location and orientation of the mobile device.

Process 600 continues by determining if the target location and orientation has been reached (603). If the target location and orientation have not been reached, the mobile device calculates a direction vector to the target location (604), determines a pulse profile based on the direction vector (605) and executes the pulse profile on the mobile device to move the mobile device to the target location (606). The pulse profile can be used to generate one or more waveforms that drive one or more actuators of the mobile device to impart motion to the mobile device. The control loop described above continues until the target location and orientation are reached.

In an embodiment, the mobile device continuously or periodically monitors inertial sensor readings and/or environment sensor readings (e.g., monitoring ambient sound using a microphone or ambient light using a light sensor) to determine when the target location and orientation is reached. In an embodiment, a target region or target range is specified rather than an exact target region or target range. For example, a target orientation of the mobile device is reached if an azimuth angle of the mobile device measured in a local-level coordinate system, such as an East North Up (ENU) coordinate system, is within a threshold number of degrees of the direction vector. A target location is reached if the mobile device is within a threshold range of the target location.

In an embodiment, the mobile device uses a measurement of the ambient environment to determine the optimum orientation of the mobile device to reduce interference from ambient noise or ambient light. For example, the mobile device can transmit a calibration signal from a loudspeaker of the mobile device and process the reflected signals to characterize the acoustic environment (e.g., determine room size). The characterization can then be used to determine a target orientation and location of the mobile device that can optimize loudspeaker placement. Similarly, an ambient light sensor of the mobile device can be used to determine an optimum location and position to reduce light reflections off a display screen of the mobile device.

In another embodiment, the haptic locomotion system can be used to orient the mobile device to direct a microphone in the direction of a signal source. For example, during a conference call using the mobile device, a user speaks a voice command requesting the mobile device to orientate itself on the surface so that a main lobe of the microphone gain pattern is in the direction of the user's voice.

Figure 7:
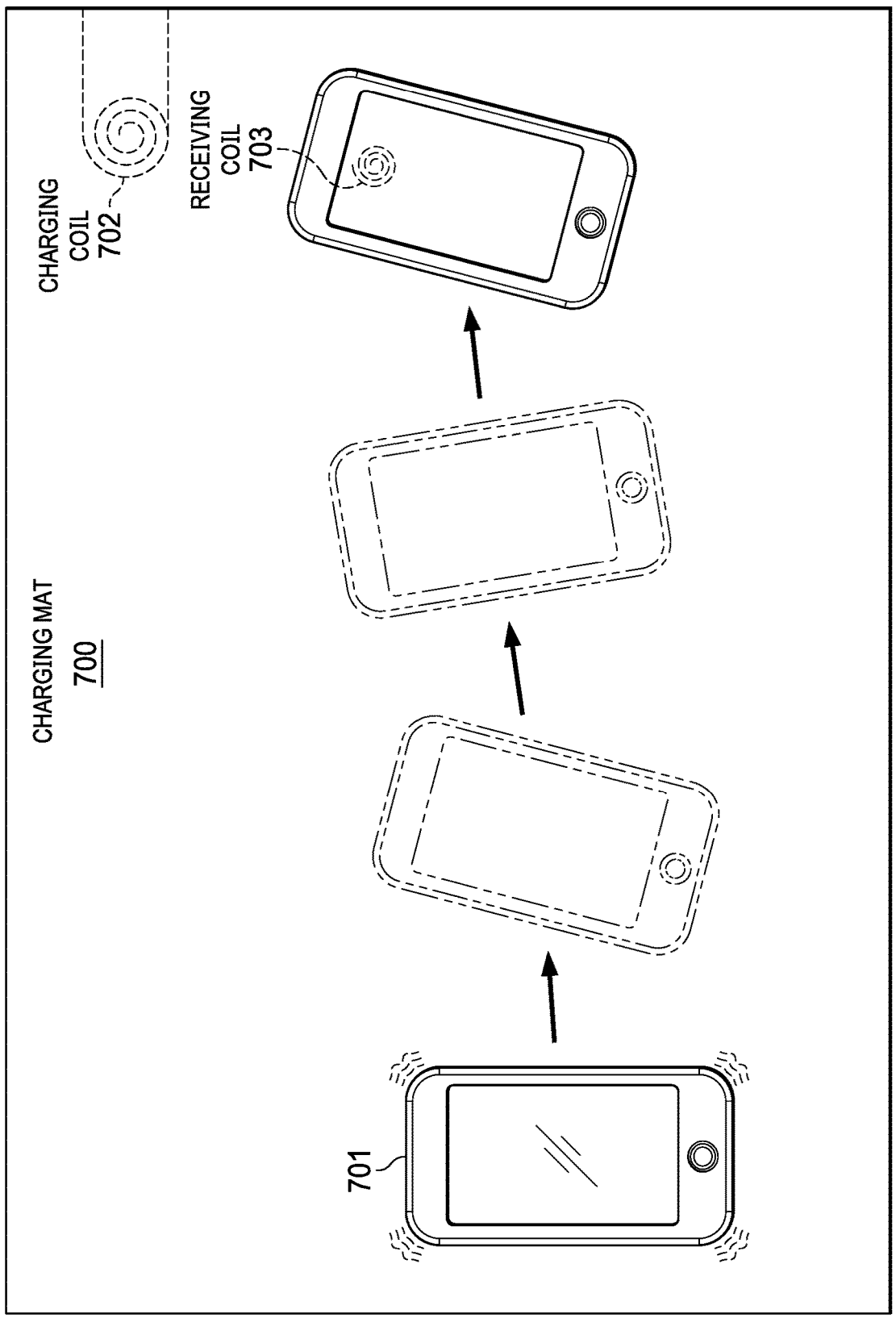
FIG. 7 illustrates improving wireless power transfer efficiency using a haptic locomotion system, according to an embodiment

FIG. 7 illustrates improving wireless power transfer efficiency using a haptic locomotion system, according to an embodiment. In this application, it is desirable to orient mobile device 701 on charging mat 700 to maximize the efficiency of inductive power transfer from charging coil 702 to receiving coil 703. Mobile device 701 can use haptic locomotion to change its position and orientation while measuring wireless power transfer efficiency, power intensity, average power intensity or any other parameter that can be used to determine power transfer efficiency by following a local electromagnetic field gradient towards peak charging power.

Figure 8A:
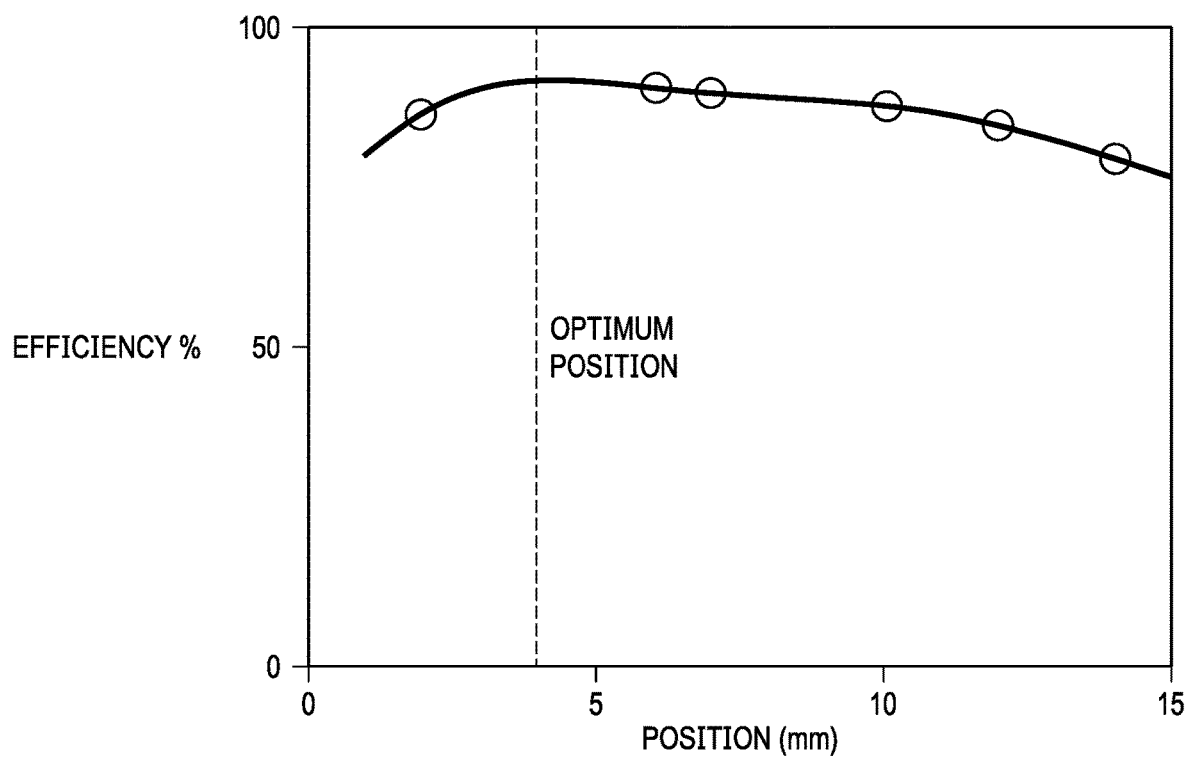
FIGS. 8A and 8B are plots that illustrate wireless power transfer efficiency as a function of distance and angle, respectively, for a mobile device using a haptic locomotion system, according to an embodiment.
Figure 8B:
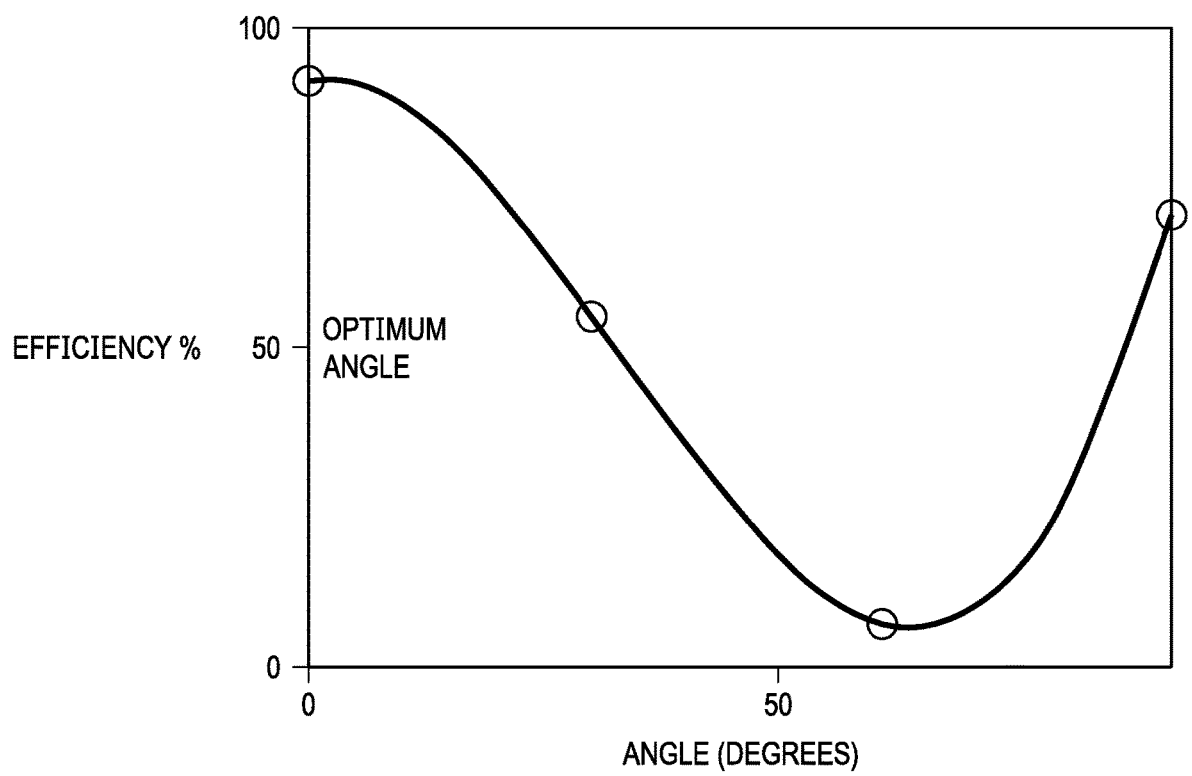

FIGS. 8A and 8B are plots illustrating wireless power transfer efficiency, or any other parameter or metric that can be used to determine wireless power transfer efficiency, as a function of distance and angle for a mobile device using a haptic locomotion system, according to an embodiment. In an embodiment, mobile device 701 can measure power transfer efficiency while the haptic locomotion system translates and/or rotates the mobile device around charging mat 700 or about its center of gravity. When maximum power transfer efficiency is detected by, for example, comparing the measured power with a known maximum power transfer efficiency or other threshold value, the haptic locomotion system can cease translating and/or rotating the mobile device.

Figure 9:
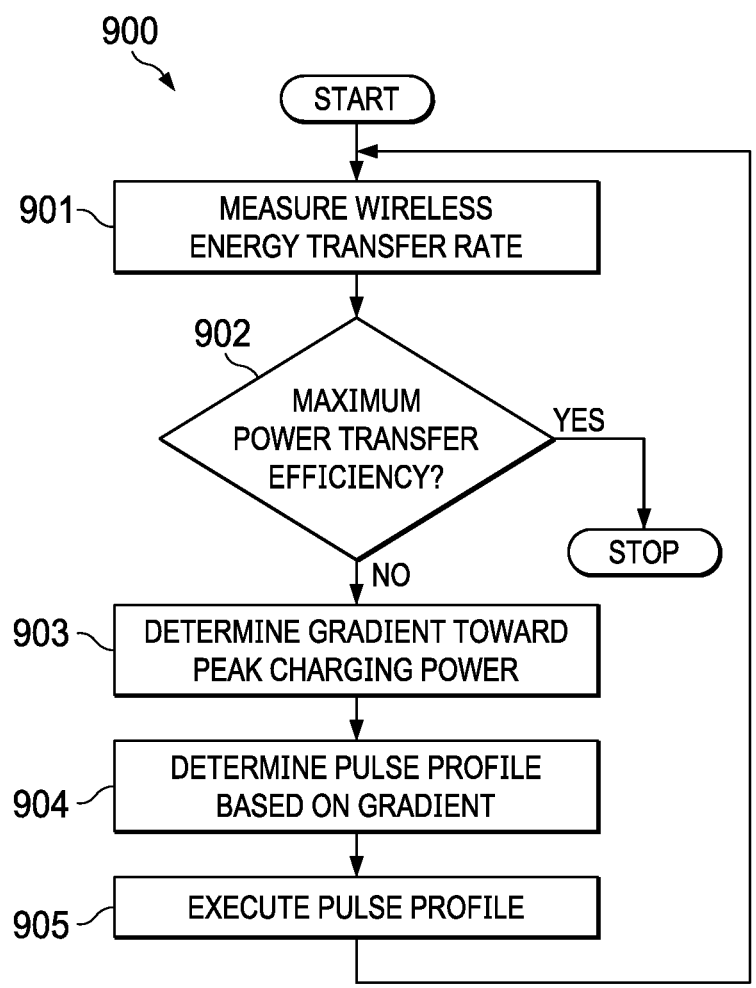
FIG. 9 is a flow diagram of an example process of improving wireless power transfer efficiency using a haptic locomotion system, according to an embodiment.

FIG. 9 is a flow diagram of an example process 900 of improving wireless power transfer efficiency using a haptic locomotion system, according to an embodiment. Process 900 can be implemented by device architecture 1700, as described in reference to FIG. 17.

Process 900 can begin by a mobile device on a charging mat measuring power transfer rate or other parameter that can be used to measure power transfer rate (901). In an embodiment, the power transfer rate can be determined by, for example, measuring the total energy into a battery of the mobile device divided by the total energy into a transmitting coil of the charging mat, averaged over the charge area/volume for a charge cycle.

Process 900 continues by determining if the maximum power transfer efficiency has been reached (902). If the maximum power transfer efficiency has not been reached, process 900 calculates an electromagnetic field gradient toward a peak charging power (903), and determines a pulse profile (904) based on the gradient to generate a pulse profile (e.g., generate one or more waveforms) to drive one or more actuators of the mobile device (905) to translate and/or rotate the mobile device towards the peak charging power.

Figure 10A:
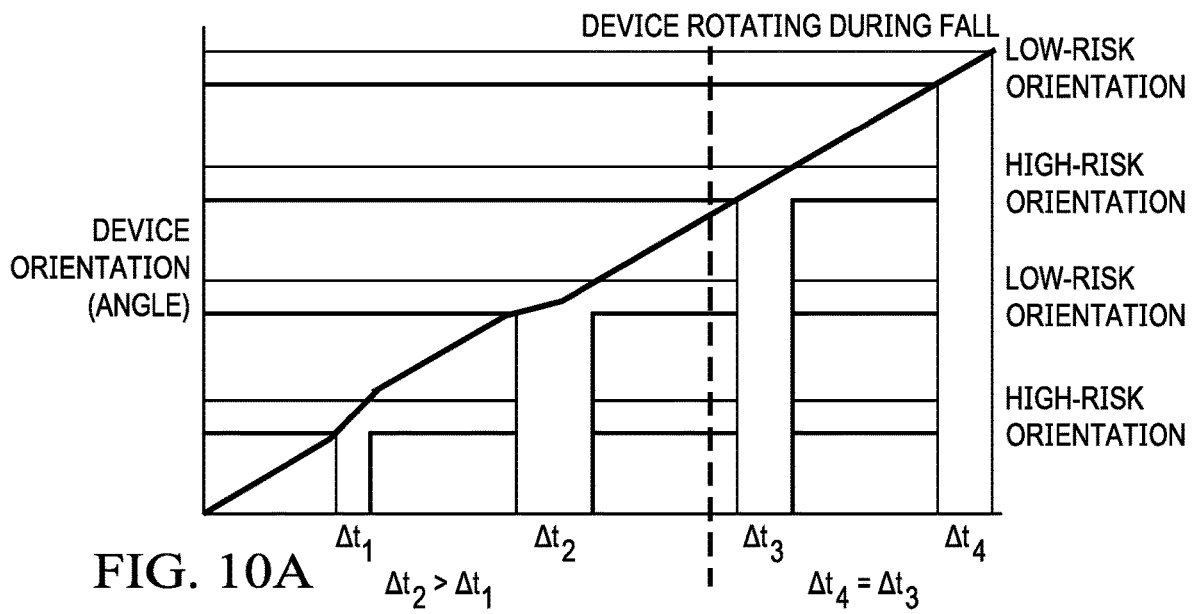
FIGS. 10A-10C are plots that illustrate using a haptic locomotion system to lock a mobile device into a low-risk orientation, or to avoid a high-risk orientation, during free fall to reduce impact damage, according to an embodiment.
Figure 10B:
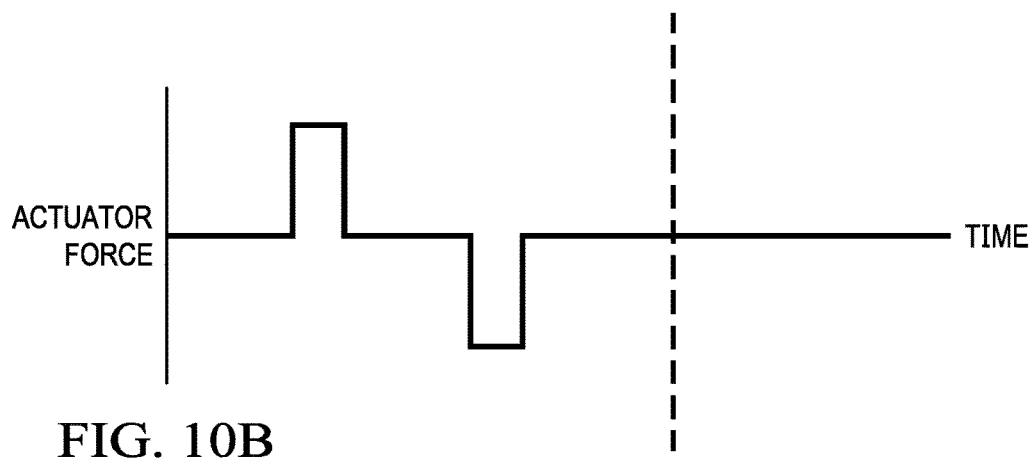
Figure 10C:
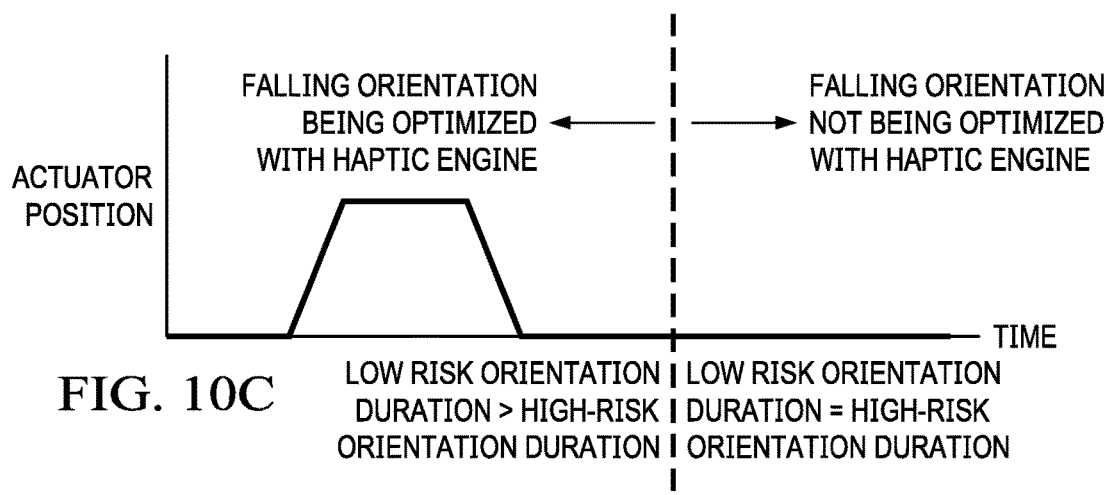

FIGS. 10A-10C are plots that illustrate using a haptic locomotion system to lock a mobile device into a low-risk orientation, or drive the mobile device away from a high-risk orientation, during free fall to reduce impact damage, according to an embodiment. For example, the mobile device can be rotated in mid-air so that a portion of the mobile device that is more resistive to damage strikes the ground first to absorb the energy of the impact. This application uses haptic locomotion to orient the falling mobile device. When the mobile device is detected to be in free-fall (e.g., based on acceleration), the moving masses of one or more actuators are driven to slow the rotation rate of the mobile device until a low-risk orientation is reached during free fall. Once a low-risk orientation is reached during free fall, the low-risk orientation is locked by, for example, engaging a maximum momentum sinusoidal vibratory motion of the one or more moving masses to hold the low-risk orientation when inertial sensors detect the low-risk state. The physics behind the locking is similar to using a Foucault pendulum as a gyroscope. In another embodiment, the mobile device is oriented away from a known high-risk orientation during free fall by driving the moving masses of one or more actuators to increase the mobile device rotation rate.

Figure 10D:
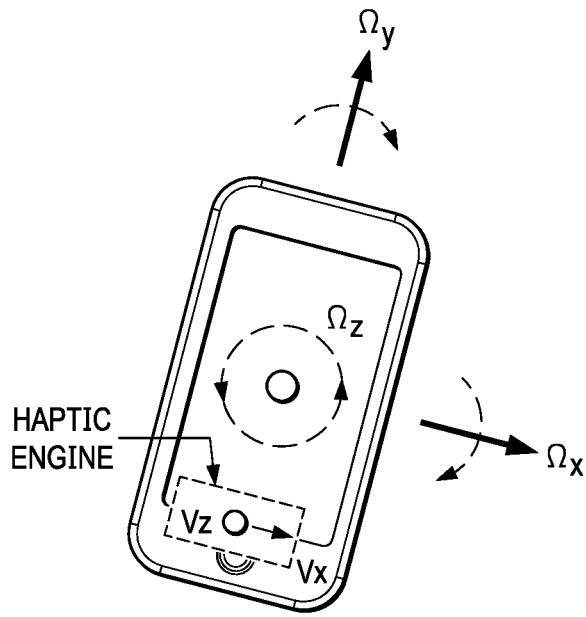
FIG. 10D further illustrates using a haptic locomotion system to lock a mobile device into a low-risk orientation while falling, according to an embodiment.

FIG. 10D further illustrates using a haptic locomotion system to lock a mobile device into a low-risk orientation while falling, according to an embodiment. In an embodiment, mobile device rotation is slowed when a low-risk orientation is reached during a free fall. This is accomplished by driving one or more actuator moving masses to reduce device rotation when the low-risk orientation is detected. In another embodiment, the device orientation is locked once the known low-risk orientation is reached during a free fall. In this embodiment, the device engages a maximum momentum sinusoidal vibratory motion to hold the orientation when motion sensors detect a known state with minimum possibility of damage. Table I below lists some example haptic engine properties.

TABLE I

Example Haptic Engine Properties

| | |
|---|---|
| 1D Actuator | x-direction |
| Proof mass (m) | 2 g |
| Drive frequency ($f_{HE}$) | 300 Hz |
| Drive displacement ($X_o$) | 1 mm |
| Spring constant ($K_x$) | 20 N/.. |
| Quality factor ($Q_z$) | 1 |
| Quality factor ($Q_x$) | 10 |

Referring to FIG. 10D, the following equations of motion are applicable to determining an amount of mechanical power to remove from a y-axis of rotation:

$$\vec{a} = 2(\vec{\Omega} \times \vec{v})\text{(Coriolis effect)},\quad [3]$$

$$\dot{x}_{HE} = x_o \omega \cos(\omega t)\text{(Haptic engine drive)},\quad [4]$$

$$\ddot{z}_{HE} = -\Omega \dot{x}_{HE}\text{(Inducded proof mass movement)},\quad [5]$$

$$m\ddot{z}_{HE} = -k_z z_{HE} - c\dot{z}_{HE}, c = m\omega_z/Q_z,\quad [6]$$

where Equation [6] is the Haptic engine equation of motion in the z-axis due to system rotation about the y-axis. Using the example Haptic engine properties in Table I, 50 µW of mechanical power should be removed from the y-axis of rotation to lock the orientation if $\Omega_y=5$ Hz.

Figure 11:
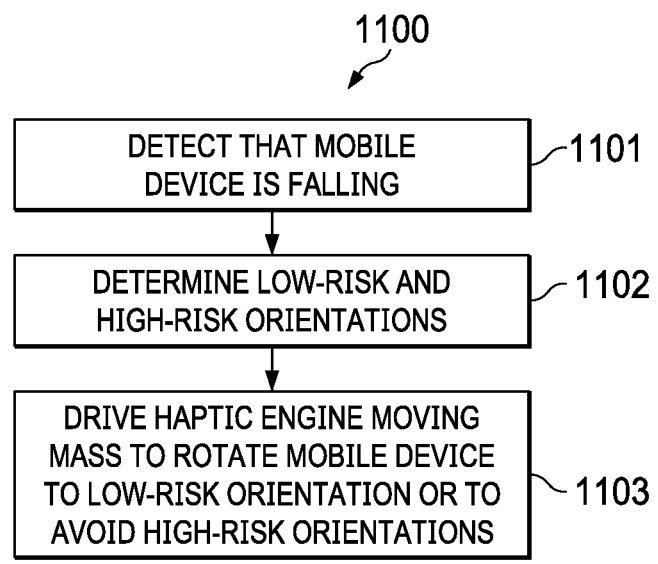
FIG. 11 is a flow diagram of an example haptic locomotion process to lock a mobile device into a low-risk orientation, or avoid a high-risk orientation, during free fall to reduce impact damage, according to an embodiment.

FIG. 11 is a flow diagram of an example haptic locomotion process to lock a mobile device into a low-risk orientation, or avoid a high-risk orientation, during free fall to reduce impact damage, according to an embodiment. Process 1100 can be implemented by device architecture 1700, as described in reference to FIG. 17.

Process 1100 can begin by detecting that a mobile device is falling (1101). For example, an accelerometer can be used to detect a sudden acceleration in a vertical direction.

Process 1100 can continue by determining a low-risk orientation for the mobile device or avoid a high-risk orientation (1102). For example, the inertial sensors can determine the mobile device orientation at the beginning of a fall and determine a target low-risk or high-risk orientation based on the mobile device orientation.

Process 1100 can continue by driving one or more actuators with the one or more waveforms to orient the mobile device to the low-risk orientation or avoid a high-risk orientation (1103).

Figure 12A:
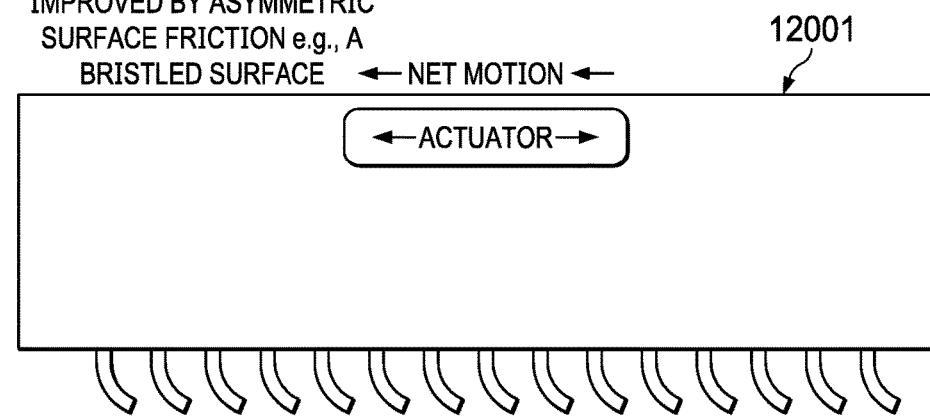
FIGS. 12A-12C illustrate improvements to mobile device travel efficiency by controlling asymmetric surface friction using a haptic locomotion system, according to an embodiment.
Figure 12B:
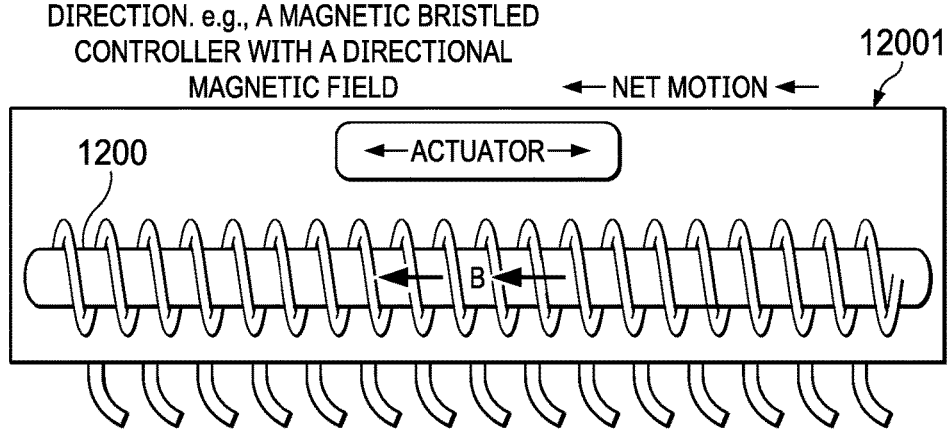
Figure 12C:
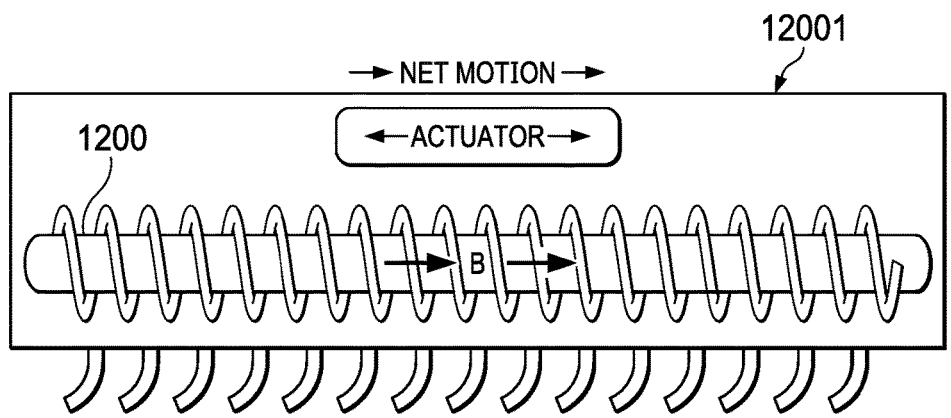

FIGS. 12A-12C illustrate improvements to mobile device travel efficiency by controlling asymmetric surface friction using a haptic locomotion system, according to an embodiment. FIG. 12A illustrates device travel efficiency improved by asymmetric surface friction 12001 (e.g., a bristled surface). FIGS. 12B and 12C illustrate simplified control of device travel direction by controlling asymmetric surface friction direction using a magnetic bristled controller 1200 with a directional magnetic field B.

Many surfaces present friction with different amplitudes in different directions. Asymmetric friction can be utilized to improve locomotion energy efficiency for a given actuator bandwidth, maximize locomotion velocity/force for a given actuator bandwidth and force and simplify controlling the direction of travel. Examples of surfaces that can exhibit asymmetric friction include but are not limited to: bristled surfaces, wrinkled surfaces and non-Newtonian material surfaces. Examples of controlling locomotion direction with control of a surface included but not limited to: magnetic bristles, magnetic wrinkles, piezoelectric wrinkles and magnetic rubber surfaces.

FIG. 13 is a flow diagram of an example process 1300 of controlling asymmetric surface friction using a haptic locomotion system, according to an embodiment. Process 1300 can be implemented by device architecture 1700, as described in reference to FIG. 17.

Process 1300 can begin by determining a desired travel direction of a mobile device on a surface with asymmetric friction (1301). Process 1300 can continue by generating a directional magnetic field in the haptic engine to control the asymmetric friction direction to align with the desired travel direction (1302). Process 1300 can continue by driving the actuator moving mass to move the mobile device in the desired travel direction (1303).

Figure 14:
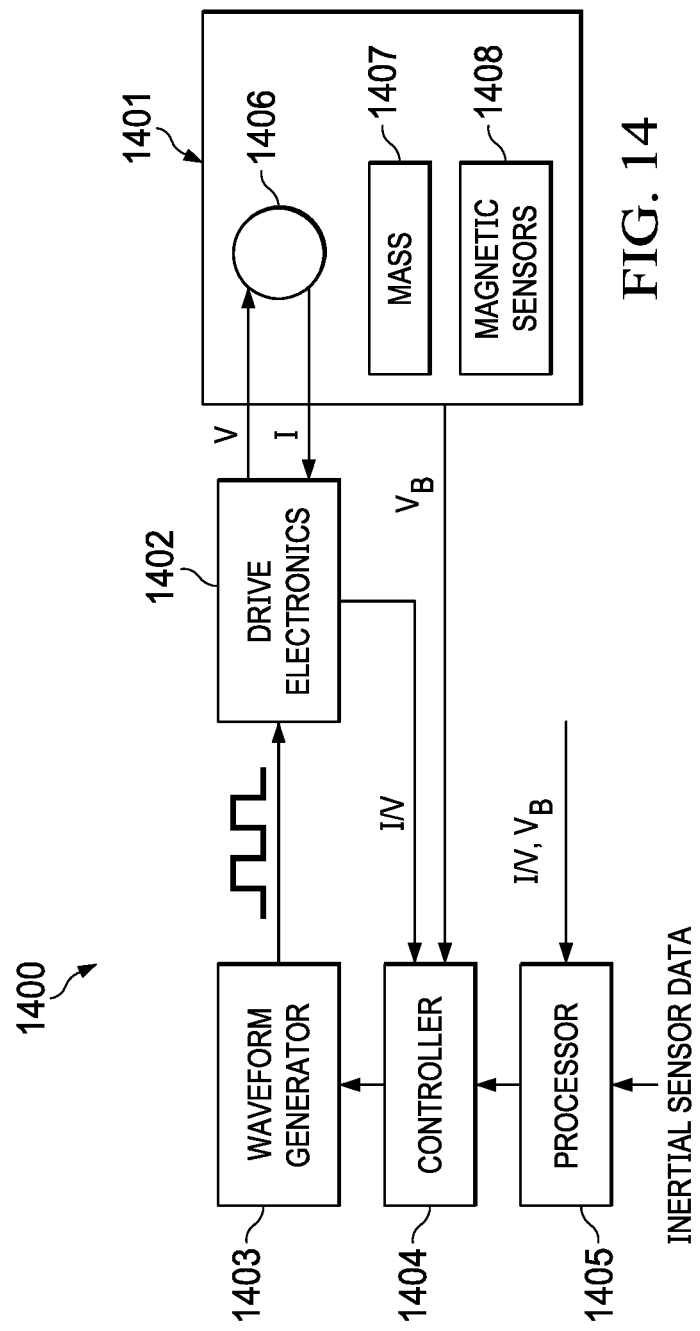
FIG. 14 is a block diagram of an example control system for haptic locomotion, according to an embodiment.

FIG. 14 is a block diagram of control system 1400 for implementing haptic locomotion, according to an embodiment. System 1400 includes actuator module 1401, drive electronics 1402, waveform generator 1403, controller 1404 and processor 1405. Actuator module 1401 further includes coils 1406, mass 1407 and magnetic sensors 1408. System 1400 is an example embodiment and other embodiments can include more or fewer components.

In an embodiment, drive electronics 1402 includes a power amplifier for driving coils 1406 in response to a waveform provided by waveform generator 1403. The waveform can be, for example, a pulse code modulation (PCM) waveform, a pulse width modulation (PWM) waveform or a pulse density modulation (PDM) waveform. Drive electronics 1402 also includes circuitry for monitoring the voltage V applied to coils 1406 and the current I flowing in coils 1406. By controlling the current flow in coils 1406, mass 1407 can be moved along a movement axis by a magnetic field induced in coils 1406. The direction of movement can be reversed by reversing the current flow in coils 1406. In an embodiment, mass 1407 is a magnet which causes a change in the magnetic field when mass 1407 is moved along the movement axis. The change in the magnetic field is sensed by one or more magnetic sensors 1408 (e.g., Hall sensors), which generate a voltage signal VB in response to the sensed magnetic field.

Controller 1404 can implement any desired control law. In an embodiment, controller 1404 includes a feedforward component for rapid response and feedback component to compensate for errors in the plant model. An example suitable controller 1404 is a proportional-integral-derivative (PID) controller that continuously calculates an error value as the difference between a desired set point and measured process variables provided by processor 1405. Other controllers can also be used that have more or less complexity, including P controllers, PI controllers, or PD controllers. In an embodiment, a state-space observer is used as a state feedback path in addition to a feedforward path. The feedback control command is u=KX=k1*x1+k2*x2, where x1 and x2 are the estimated position and velocity of mass 1407, respectively. In another embodiment, the feedback u is a non-linear function of the states, u=g(x, t), such as a sliding-mode control. The position and velocity of mass 1407 can be estimated from a magnetic model implemented by processor 1405.

In an embodiment, processor 1405 can implement a state observer and one or more models (e.g., a back EMF model) for estimating the displacement and velocity of mass 1407. Processor 1405 also receives information from inertial sensors to generate actuator commands which are input to waveform generator 1403, which then uses the actuator commands to generate waveforms to affect the desired haptic locomotion as described in reference to FIGS. 1-13.

Figure 16:
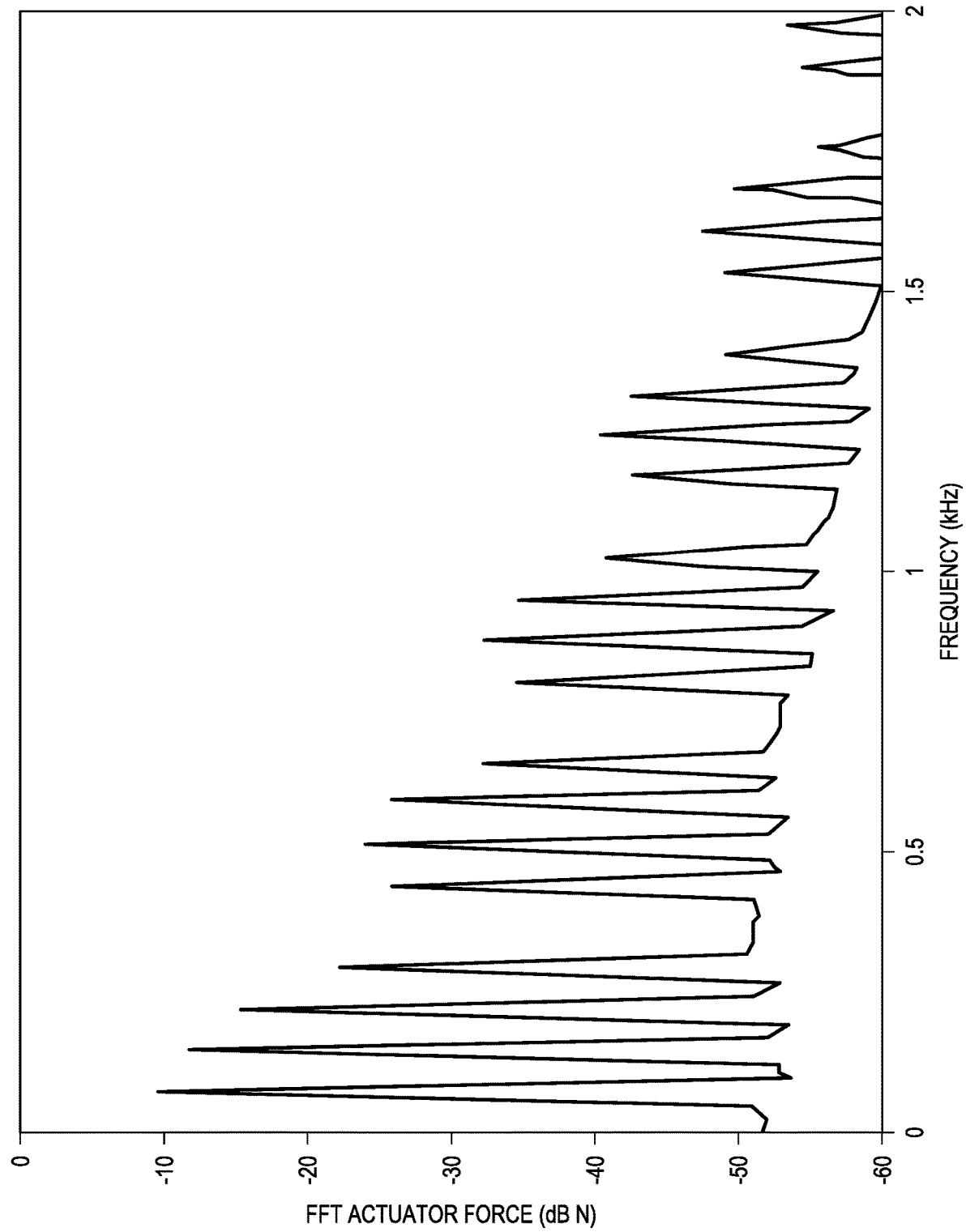
FIG. 16 is a frequency plot of a driving pulse train for a wide-band actuator to affect haptic locomotion, according to an embodiment.

FIGS. 15A-15C are plots of an example actuation force, friction force and accelerating force associated with haptic locomotion using a wide-band actuator, according to an embodiment. To implement the applications described above, a wide-band (e.g., 1 KHz) haptic engine can be used. FIGS. 15A-15C illustrate the actuator force, friction force and accelerating force resulting from controlled net motion using a wide-band actuator. If a narrow-band (e.g., 0.1 KHz) actuator is used then there may be no net motion to control. FIG. 16 is a frequency plot of a 1 kHz wide (3 dB-bandwidth) actuator driving pulse train for affecting haptic locomotion.

Example Device Architecture

Figure 17:
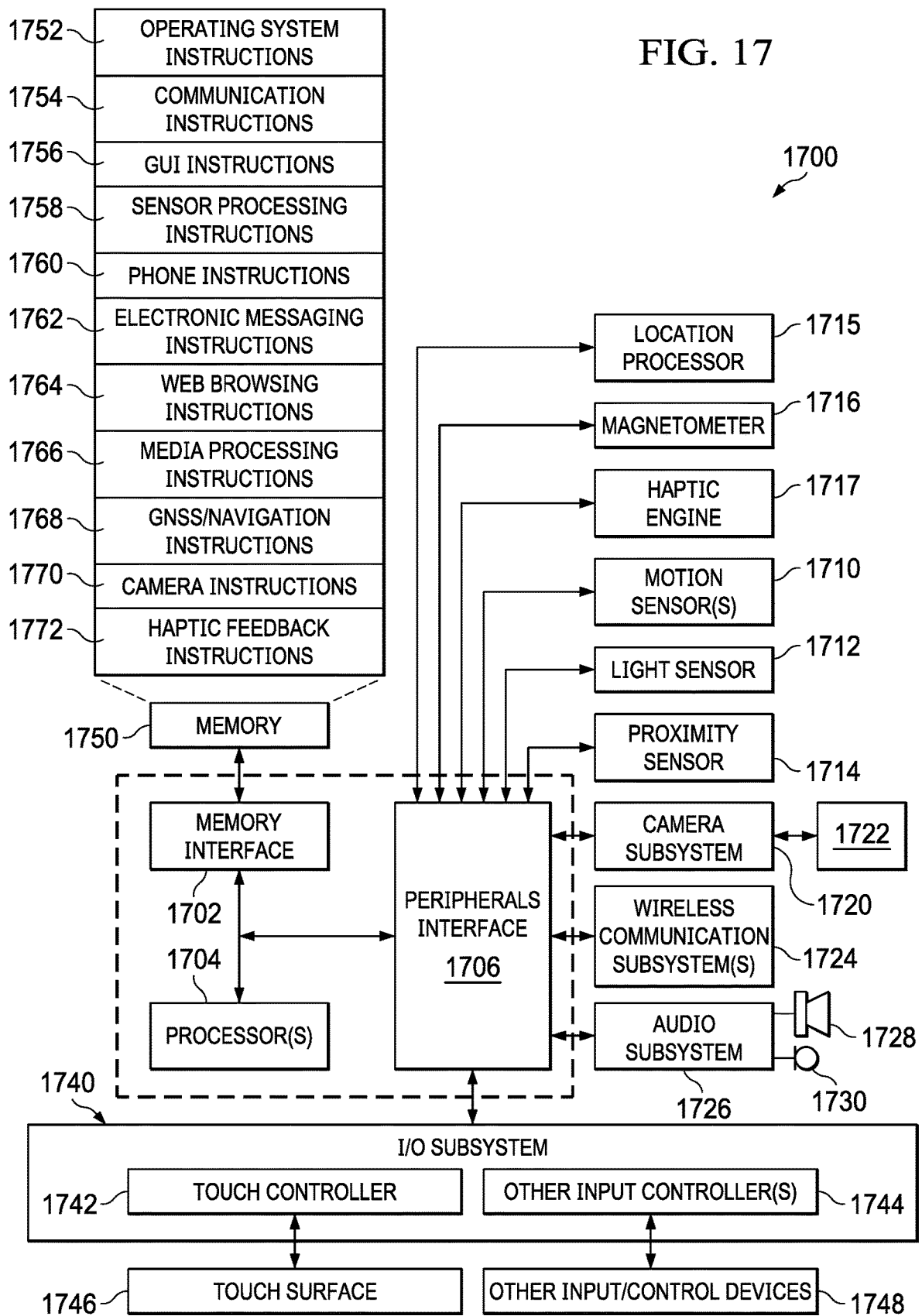
FIG. 17 is a diagram of an example mobile device architecture that uses a haptic locomotion system as described in reference to FIGS. 1-16, according to an embodiment.

FIG. 17 is a diagram of an example mobile device architecture that uses a haptic locomotion system as described in reference to FIGS. 1-16, according to an embodiment.

Architecture 1700 may be implemented in any mobile device for generating the features and processes described in reference to FIGS. 1-16, including but not limited to smart phones and wearable computers (e.g., smart watches, fitness bands). Architecture 1700 may include memory interface 1702, data processor(s), image processor(s) or central processing unit(s) 1704, and peripherals interface 1706. Memory interface 1702, processor(s) 1704 or peripherals interface 1706 may be separate components or may be integrated in one or more integrated circuits. One or more communication buses or signal lines may couple the various components.

Sensors, devices, and subsystems may be coupled to peripherals interface 1706 to facilitate multiple functionalities. For example, motion sensor(s) 1710, light sensor 1712, and proximity sensor 1714 may be coupled to peripherals interface 1706 to facilitate orientation, lighting, and proximity functions of the device. For example, in some embodiments, light sensor 1712 may be utilized to facilitate adjusting the brightness of touch surface 1746. In some embodiments, motion sensor(s) 1710 (e.g., an accelerometer, rate gyroscope) may be utilized to detect movement and orientation of the device. Accordingly, display objects or media may be presented according to a detected orientation (e.g., portrait or landscape).

Haptic engine 1717, under the control of haptic engine instructions 1772, provides the features and performs the processes described in reference to FIGS. 1-16, such as, for example, implementing haptic feedback (e.g., vibration). Haptic engine 1717 can include one or more actuators, such as piezoelectric transducers, electromechanical devices, and/or other vibration inducing devices that are mechanically connected to an input surface (e.g., touch surface 1746). Drive electronics coupled to the one or more actuators cause the actuators to induce a vibratory response into the input surface, providing a tactile sensation to a user touching or holding the device.

Other sensors may also be connected to peripherals interface 1706, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 1717 can be used as a temperature sensor.

Location processor 1715 (e.g., GNSS receiver chip) may be connected to peripherals interface 1706 to provide geo-referencing. Electronic magnetometer 1716 (e.g., an integrated circuit chip) may also be connected to peripherals interface 1706 to provide data that may be used to determine the direction of magnetic North. Thus, electronic magnetometer 1716 may be used to support an electronic compass application.

Camera subsystem 1720 and an optical sensor 1722, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1724. Communication subsystem(s) 1724 may include one or more wireless communication subsystems. Wireless communication subsystems 1724 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 1724 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 1724 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 1726 may be coupled to a speaker 1728 and one or more microphones 1730 to facilitate voice-enabled functions, such as voice recognition, voice replication, digital recording, and telephony functions. In an embodiment, audio subsystem includes a digital signal processor (DSP) that performs audio processing, such as implementing codecs. In an embodiment, the audio DSP implements at least some portions of control system 1400.

I/O subsystem 1740 may include touch controller 1742 and/or other input controller(s) 1744. Touch controller 1742 may be coupled to a touch surface 1746. Touch surface 1746 and touch controller 1742 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 1746. In one embodiment, touch surface 1746 may display virtual or soft buttons and a virtual keyboard, which may be used as an input/output device by the user.

Other input controller(s) 1744 may be coupled to other input/control devices 1748, such as one or more buttons, rocker switches, thumb-wheel, infrared port, USB port, and/or a pointer device such as a stylus. The one or more buttons (not shown) may include an up/down button for volume control of speaker 1728 and/or microphone 1730.

In some embodiments, device 1700 may present recorded audio and/or video files, such as MP3, AAC, and MPEG video files. In some embodiments, device 1700 may include the functionality of an MP3 player and may include a pin connector for tethering to other devices. Other input/output and control devices may be used.

Memory interface 1702 may be coupled to memory 1750. Memory 1750 may include high-speed random access memory or non-volatile memory, such as one or more magnetic disk storage devices, one or more optical storage devices, or flash memory (e.g., NAND, NOR). Memory 1750 may store operating system 1752, such as Darwin, RTXC, LINUX, UNIX, OS X, iOS, WINDOWS, or an embedded operating system such as VxWorks. Operating system 1752 may include instructions for handling basic system services and for performing hardware dependent tasks. In some embodiments, operating system 1752 may include a kernel (e.g., UNIX kernel).

Memory 1750 may also store communication instructions 1754 to facilitate communicating with one or more additional devices, one or more computers or servers, including peer-to-peer communications. Communication instructions 1754 may also be used to select an operational mode or communication medium for use by the device, based on a geographic location (obtained by the GPS/Navigation instructions 1768) of the device.

Memory 1750 may include graphical user interface instructions 1756 to facilitate graphic user interface processing, including a touch model for interpreting touch inputs and gestures; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions; media processing instructions 1766 to facilitate media processing-related processes and functions; GNSS/Navigation instructions 1768 to facilitate GNSS (e.g., GPS, GLOSSNAS) and navigation-related processes and functions; camera instructions 1770 to facilitate camera-related processes and functions; and haptic engine instructions 1772 for commanding or controlling haptic engine 1717 and to provide the features and performing the processes described in reference to FIGS. 1-16.

Each of the above identified instructions and applications may correspond to a set of instructions for performing one or more functions described above. These instructions need not be implemented as separate software programs, procedures, or modules. Memory 1750 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C # and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining a target location and orientation of a mobile device on a surface;
   determining a surface material type;
   determining a current location of the mobile device on the surface based on the surface material type;
   determining a current orientation of the mobile device based on motion data;
   generating one or more waveforms based on the current and target mobile device locations and orientations;
   responsive to the one or more waveforms, driving one or more actuators of the mobile device to move the mobile device on the surface;
   measuring the motion of the mobile device on the surface resulting from driving the one or more actuators with the one or more waveforms;
   based at least in part on the measuring, determining that the mobile device has reached the target location and orientation; and
   initiating one or more actions on the mobile at the target location and orientation.

2. The method of claim 1, wherein determining the current location the mobile device further comprises:
   determining a friction coefficient for the surface material type based on the measured motion;
   determining the surface material type based on the friction coefficient; and
   determining the current location based at least in part on the surface material type.

3. The method of claim 1, wherein the surface is a charging mat and the method further comprises:
   monitoring power transfer efficiency between the charging mat and the mobile device; and
   determining, based at least in part on the monitoring, that the mobile device is in the target orientation and at the target location.

4. The method of claim 1, further comprising:
   monitoring received signal strength measurements of radio frequency signals while the mobile device is in motion; and
   determining, based at least in part on the monitoring, that the mobile device is in the target orientation and at the target location.

5. The method of claim 1, further comprising:
   monitoring received audio signals while the mobile device is in motion; and
   determining, based at least in part on the monitoring, that the mobile device is in the target orientation and at the target location.

6. The method of claim 1, further comprising:
   adapting the one or more waveforms to correct for the material of the surface and the orientation of the mobile device.

7. The method of claim 1, further comprising:
   terminating the driving of the one or more actuators if an asymmetry of motion of the mobile device is detected.

8. The method of claim 7, wherein the asymmetry of motion is measured by the mobile device during a transition between static and kinetic friction in opposite driving directions.

9. The method of claim 7, wherein the asymmetry of motion is measured while the mobile device is in a kinetic friction state by measuring a relative angle between a direction of drive motion and a direction of actual motion.

10. The method of claim 1, wherein determining, by the mobile device, the surface material further comprises:
using the one or more waveforms to drive the one or more actuators;
measuring, using an inertial sensor, an acceleration of the mobile device;
determining a friction force on the mobile device multiplying a mass of the mobile device by the acceleration;
determining a normal force exerted by the mobile device on the surface;
determining a static or kinetic coefficient of friction by dividing the friction force by the normal force; and
using the static or kinetic coefficient of friction to identify the material of the surface.

11. A mobile device comprising:
one or more actuators;
one or more motion sensors generating motion data;
a radio frequency signal receiver;
one or more processors;
memory storing instructions that when executed cause the one or more processors to perform operations comprising:
determining a target location and orientation of the a mobile device on a surface;
determining a surface material type;
determining a current location of the mobile device on the surface based on the surface material type;
determining a current orientation of the mobile device on the surface based on the motion data;
generating one or more waveforms based on the current and target mobile device locations and orientations;
responsive to the one or more waveforms, driving one or more actuators of the mobile device to move the mobile device on the surface;
receiving motion data describing the mobile device motion on the surface resulting from driving the one or more actuators with the one or more waveforms;
based at least in part on the motion data, determining that the mobile device has reached the target location and orientation; and
initiating one or more actions on the mobile at the target location and orienation.

12. The mobile device of claim 11, wherein determining the current location of the mobile device further comprises:
determining a friction coefficient for the surface based on the motion data;
determining the surface material type based on the friction coefficient; and
determining the current location based at least in part on the surface material type.

13. The mobile device of claim 11, wherein the surface is a charging mat and the operations further comprise:
monitoring power transfer efficiency between the charging mat and the mobile device; and
determining, based at least in part on the monitoring, that the mobile device is in the target orientation and at the target location.

14. The mobile device of claim 11, the operations further comprising:
monitoring received signal strength measurements of radio frequency signals while the mobile device is in motion, the received signal strength measures based on radio frequency signals received by the radio frequency signal receiver; and
determining, based at least in part on the monitoring, that the mobile device is in the target orientation and at the target location.

15. The mobile device of claim 11, further comprising:
monitoring received audio signals while the mobile device is in motion; and
determining, based at least in part on the monitoring, that the mobile device is in the target orientation and at the target location.

16. The mobile device of claim 11, wherein the operations further comprise:
adapting the one or more waveforms to correct for the material of the surface and the orientation of the mobile device.

17. The mobile device of claim 11, further comprising:
terminating the driving of the one or more actuators if an asymmetry of motion of the mobile device is detected.

18. The mobile device of claim 17, wherein the asymmetry of motion is measured by the mobile device during a transition between static and kinetic friction in opposite driving directions.

19. The mobile device of claim 17, wherein the asymmetry of motion is measured while the mobile device is in a kinetic friction state by measuring a relative angle between a direction of drive motion and a direction of actual motion.

20. The mobile device of claim 11, wherein determining, by the mobile device, the surface material further comprises:
using the one or more waveforms to drive the one or more actuators;
measuring, using an inertial sensor, an acceleration of the mobile device;
determining a friction force on the mobile device multiplying a mass of the mobile device by the acceleration;
determining a normal force exerted by the mobile device on the surface;
determining a static or kinetic coefficient of friction by dividing the friction force by the normal force; and
using the static or kinetic coefficient of friction to identify the material of the surface.

21. The mobile device of claim 20, wherein using the static or kinetic coefficient of friction to identify the material of the surface includes using the static or kinetic coefficient of friction to loop the material in a look-up table.

* * * * *

UNITED STATES PATENT AND TRADEMARK OFFICE
CERTIFICATE OF CORRECTION

PATENT NO. : 10,694,014 B2
APPLICATION NO. : 15/713555
DATED : June 23, 2020
INVENTOR(S) : Jere C. Harrison, Alex J. Speltz and Sheng Liu Page 1 of 1

It is certified that error appears in the above-identified patent and that said Letters Patent is hereby corrected as shown below:

In the Claims

Column 16, Line 28, in Claim 2, after "location" insert -- of --;

Column 17, Line 25, in Claim 11, delete "the a" and insert -- the --.

Signed and Sealed this
Twenty-second Day of December, 2020

Andrei Iancu
*Director of the United States Patent and Trademark Office*